(12) United States Patent
McNeil Brown

(10) Patent No.: US 9,404,767 B2
(45) Date of Patent: Aug. 2, 2016

(54) METHODS AND SYSTEMS FOR PERFORMING CHARTING TASKS

(75) Inventor: Ross McNeil Brown, Portland, OR (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 13/157,392

(22) Filed: Jun. 10, 2011

(65) Prior Publication Data

US 2012/0316776 A1    Dec. 13, 2012

(51) Int. Cl.
*G06F 3/048* (2013.01)
*G01C 21/00* (2006.01)
*G01C 23/00* (2006.01)
*G01C 21/36* (2006.01)

(52) U.S. Cl.
CPC ............ *G01C 23/005* (2013.01); *G01C 21/367* (2013.01); *G01C 21/3664* (2013.01)

(58) Field of Classification Search
CPC . G01C 21/3667; G01C 21/367; G01C 23/005
See application file for complete search history.

(56) References Cited

U.S. PATENT DOCUMENTS

| | | | | |
|---|---|---|---|---|
| 4,994,974 A * | 2/1991 | Cummings | .................... | 701/532 |
| 5,340,061 A * | 8/1994 | Vaquier et al. | ................. | 244/175 |
| 5,638,523 A * | 6/1997 | Mullet et al. | .................. | 715/855 |
| 5,731,979 A * | 3/1998 | Yano et al. | ..................... | 701/455 |
| 6,452,544 B1 * | 9/2002 | Hakala et al. | ............ | 342/357.31 |
| 6,898,523 B2 * | 5/2005 | Cochlovius et al. | .......... | 701/455 |
| 7,075,512 B1 | 7/2006 | Fabre et al. | | |
| 7,555,725 B2 * | 6/2009 | Abramson et al. | ............ | 715/781 |
| 7,774,107 B2 | 8/2010 | Brown | | |
| 2002/0163547 A1 | 11/2002 | Abramson et al. | | |
| 2005/0195154 A1 | 9/2005 | Robbins et al. | | |
| 2006/0063539 A1 * | 3/2006 | Beyer, Jr. | ................. | H04W 4/02 455/456.3 |
| 2008/0040684 A1 * | 2/2008 | Crump | .......................... | 715/808 |
| 2008/0092073 A1 * | 4/2008 | Shih et al. | ..................... | 715/765 |
| 2008/0284795 A1 | 11/2008 | Ebert et al. | | |
| 2009/0182501 A1 | 7/2009 | Fyke et al. | | |
| 2011/0128164 A1 | 6/2011 | Kang et al. | | |

(Continued)

FOREIGN PATENT DOCUMENTS

DE    10 2007 039 669 A1    2/2009
EP          2 533 229 A1    12/2012

(Continued)

OTHER PUBLICATIONS

Partial European Search Report of Application No. 12171397.8; Dec. 5, 2014; 9 pages.
Extended European Search Report for application No. 12171397.8, Apr. 13, 2015, 14 pages.

*Primary Examiner* — James Trammell
*Assistant Examiner* — Adam Mott
(74) *Attorney, Agent, or Firm* — Armstrong Teasdale LLP

(57) ABSTRACT

A method for accessing information on an electronic version of an navigation information display is described. The method includes displaying navigation information on a display of a device, the device incorporating a touch screen, sensing a user touch on the touch screen, determining, by the device, a location on the touch screen where the user touch has occurred, correlating the location on the touch screen where the user touch has occurred with a location on the navigation information display, and displaying a magnified area of a portion of the navigation information proximate the location on the touch screen where the user touch occurred.

16 Claims, 7 Drawing Sheets

(56) References Cited

U.S. PATENT DOCUMENTS

2012/0200603 A1* 8/2012 Backer et al. .................. 345/650
2012/0316782 A1* 12/2012 Sartipi et al. .................. 701/455

FOREIGN PATENT DOCUMENTS

| JP | 2007-072233 | 3/2007 |
| JP | 2010-175883 | 8/2010 |

* cited by examiner

METHODS AND SYSTEMS FOR PERFORMING CHARTING TASKS

BACKGROUND OF THE INVENTION

This invention relates generally to aircraft cockpit displays and more particularly, to methods and systems for performing charting tasks on aircraft cockpit displays.

At least some known aircraft include cockpit displays use charts and other information displays that aid in navigation and situational awareness. For example, charts displayed on electronic displays, referred to herein as electronic charts, typically are used for a wide variety of aspects of flight and flight planning. However, certain elements on such electronic charts are difficult to read. While magnification of such on the displays is known, such systems are limited to the magnification of the entire chart or display even though the context of the information may be reduced when zoomed in to a level required for readability. Outside of magnifying the entire chart, there are no known systems or methods that allow for enhanced readability of specific electronic chart elements, particularly under low light conditions. Further, cumbersome zooming of the entire area display may sometimes result in a desired portion of the information being off-screen in order to view a second portion of the information. Finally, the attention that a pilot has to utilize when zooming in and zooming out on an electronic chart would be better utilized elsewhere.

It is apparent that an approach to viewing of relevant information about the points on an electronic chart, for example, latitude/longitude, radial and distance to a VOR outside of zooming in and out on an electronic chart would be beneficial to aircraft operation.

BRIEF DESCRIPTION OF THE INVENTION

In one embodiment, a method for accessing information on an electronic version of a navigation information display is provided. The method includes displaying navigation information on a display of a device, the device incorporating a touch screen, sensing a user touch on the touch screen, determining, by the device, a location on the touch screen where the user touch has occurred, correlating the location on the touch screen where the user touch has occurred with a location on the navigation information display, and displaying a magnified area of a portion of the navigation information proximate the location on the touch screen where the user touch occurred.

In another aspect, one or more computer-readable storage media having computer-executable instructions embodied thereon are provided. When executed by at least one processor, the computer-executable instructions cause the at least one processor to display navigation information on a touch screen display of a device associated with the at least one processor, sense a first user touch on the touch screen, determine, by the device, a location on the touch screen where the first user touch has occurred, correlate the location on the touch screen where the first user touch has occurred with a location in the navigation information, and display at least one charting tool proximate the location on the touch screen where the first user touch occurred, the charting tool overlaid over the navigation information.

In still another aspect, a system for displaying electronic navigation charts is provided. The system includes a processing device, a memory coupled to the processing device, the memory for storing data defining the electronic navigation charts, and a display comprising a touch screen communicatively coupled to the processing device. The processing device is configured to cause the electronic navigation charts to be displayed on the display, receive data from the touch screen indicating one or more user touches on the touch screen, determine, based on the data received from the touch screen, a location on the touch screen where the one or more user touches have occurred, correlate the location on the touch screen where the one or more user touches have occurred with the data defining the electronic navigation charts, and cause at least one charting tool to be displayed on the display proximate the location on the touch screen where the one or more user touches occurred, the at least one charting tool overlaid over the electronic navigation charts.

DETAILED DESCRIPTION OF THE INVENTION

The described embodiments are directed to the implementation of virtual tools for use while performing typical charting tasks on electronic charts or other sources of electronic navigation information. The embodiments may be practiced in any of an aviation, land navigation, or water navigation environment. One exemplary embodiment is a virtual magnifying glass that, through touch screen interaction, can be placed over a chart, providing a magnified view of a chosen area of the chart, while also providing readouts of latitude and longitude of the center of the area under magnification. Such embodiments allow for the magnification of an area of interest on the electronic without requiring the user to "zoom in" the entire chart.

Other data can be provided in these magnified areas including, but not limited to, radial and distance from a VOR, distance to another selected object, and others. Contemplated embodiments also include multiple touch interfaces to allow designation of two points of interest, and a tool that can be used, along with the afore mentioned two touches, to easily measure distance and bearing between the two points of interest. Additional embodiments include a waypoint creation tool, a VOR tool, a distance and bearing tool, and other tools.

The described embodiments, as further described herein, provide enhanced readability of selected navigation information elements through magnification, including readability under low light conditions. Enhanced readability of particular textual elements can be read without the cumbersome zooming of the entire electronic chart. Intuitive identification of points of interest through touch interaction, and viewing of relevant information about the points is also provided, including, but not limited to, latitude/longitude, radial and distance to a VOR, as well as intuitive creation of waypoints through touch interaction and with improved accuracy due to magnification. In addition, the described embodiments eliminate, or at least greatly decrease manipulation of the electronic chart through the use of a computer mouse and/or keyboard as is done when utilizing current electronic charting methodologies.

Figure 1:
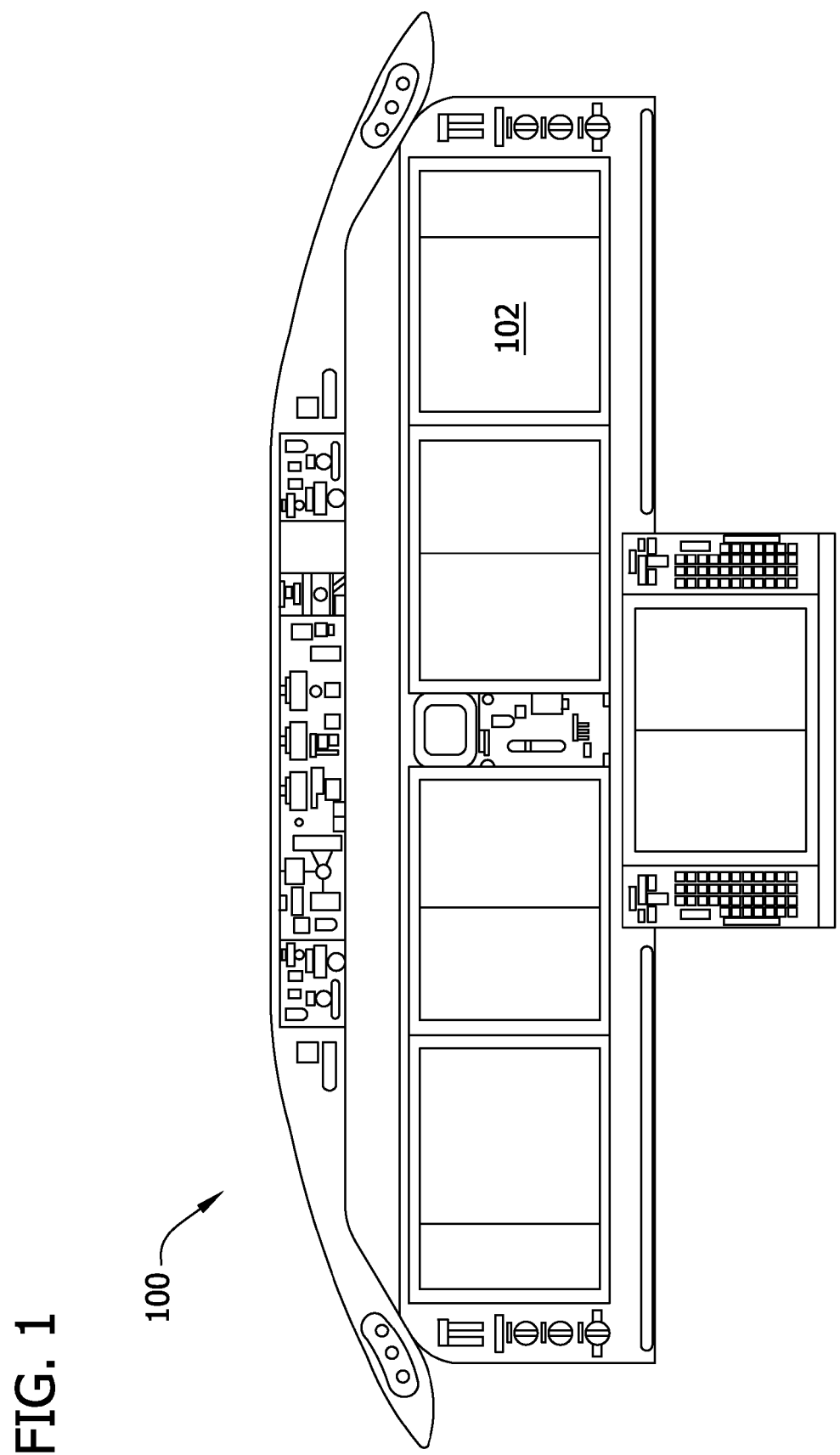
FIG. 1 is a forward perspective view of an exemplary aircraft cockpit display panel that includes at least one display screen in accordance with an embodiment of the present invention.

By way of introduction, FIG. 1 is a forward perspective view of an exemplary aircraft cockpit display panel 100 that includes at least one display screen 102 in accordance with an illustrative embodiment. In the illustrative embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag (not shown), which may be embodied as a standalone device such as, but not limited to a PDA or laptop PC, or as a software component of a system executing on a processor that is part of a subsystem of the aircraft.

In the exemplary embodiment, the electronic flight bag includes an electronic storage device configured to store various user-configurable flight-related objects for all required and desired information for a particular flight, such as flight routes, as defined by, for example, way-points, airport information, temporary flight restrictions, and weather information as well as any other user-defined objects associated with a flight, ground operations, and/or flight planning. Certain of these include electronic versions of aviation charts and/or navigation charts, sometimes collectively referred to herein as electronic charts. The electronic flight bag receives data from various aircraft and ground sensors and systems, determines flight information based on the received data in real-time, and displays the flight information and/or alerts the flight crew through display screen 102 and other aural and/or visual indicators positioned on cockpit display panel 100. Such flight information provides the flight crew with additional situational awareness during all phases of aircraft operation. In accordance with the embodiments described herein, the above described examples are considered to incorporate one or more touch screens.

Figure 2:
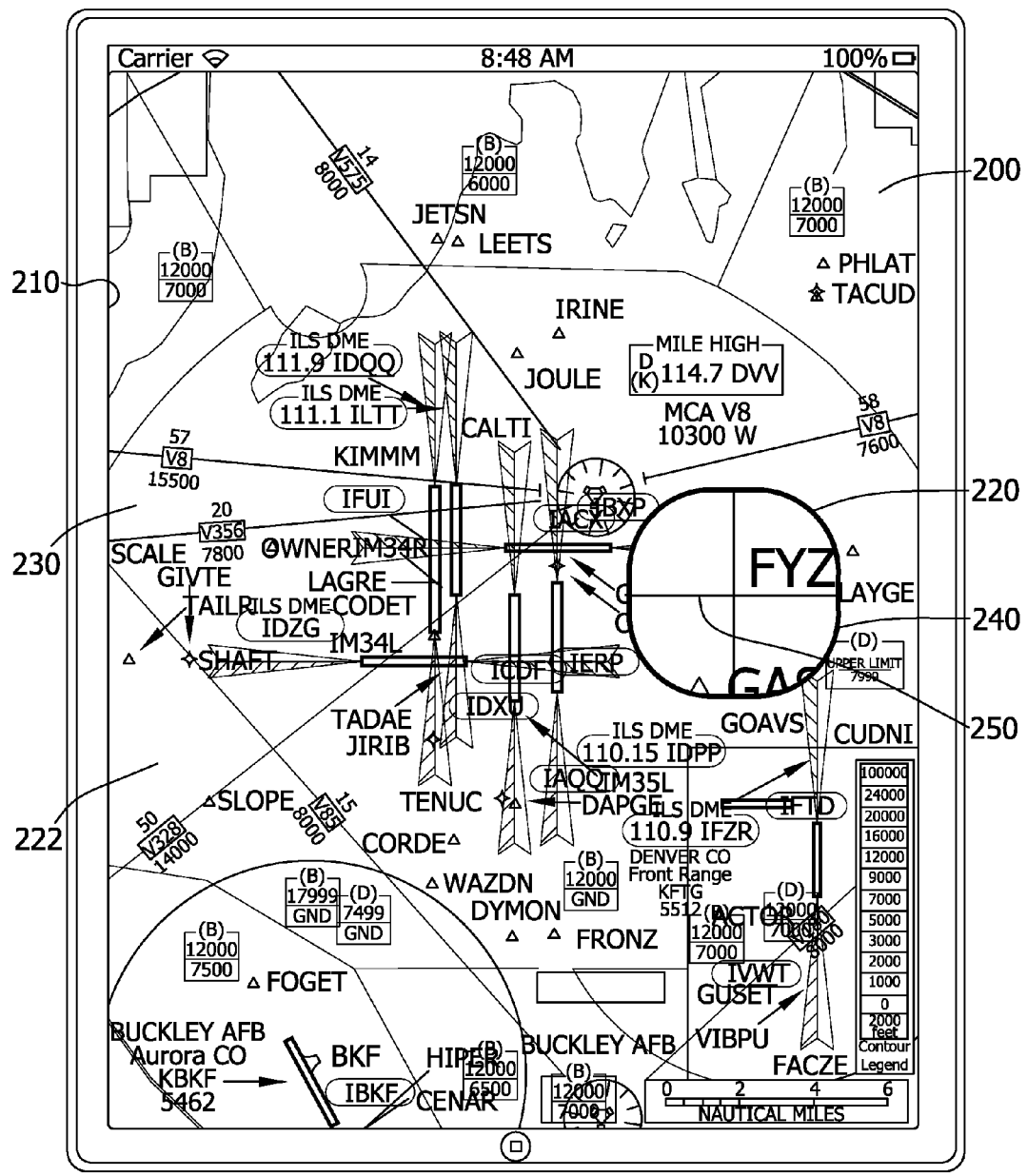
FIG. 2 is an illustration of an aviation chart including a magnified area overlaid thereon.

FIG. 2 is an illustration of a navigation chart 200 (i.e., an electronic chart) according to one embodiment that is used in aviation. Chart 200 is displayed on a display 210. Chart 200 includes a magnified area 220. Magnified area 220 is illustrative of an embodiment of a magnifier for textual data on aviation chart 200. As shown in FIG. 2, magnified area 220 is shown as appearing over the remainder of screen content 222 without relevant content within the magnified area 220. The magnified area 220 appears when a user touches the screen portion 230 of the display 210, in one embodiment, for more than two seconds. In an exemplary embodiment, the magnified area 220 is positioned just above the point where the user touched the screen portion 230 thereby making the magnified area visible even though the user's finger may still be touching the display 210. In various embodiments, users may change the size of the magnified area 220 through additional user input. In various embodiments, the magnified area 220 is removed from the display after a predetermined amount of time has passed since a touch by a user on the touch screen display 210.

As shown, the content of magnified area 220 is magnified, and magnified area 220 is identified by a boundary 240 enclosing the magnified area 220. In embodiments, crosshairs 250 may be incorporated within the magnified area 220 to provide a user with a greater degree of accuracy when using.

In embodiments, the user is able to move the magnified area 220 over the chart 200 as the user's finger moves across the screen portion 230 of the display 210. As the magnified area 220 is moved, the content of the magnified area 220 changes according to the relative position of the magnified area 220 with respect to the chart 200 being displayed.

Figure 3:
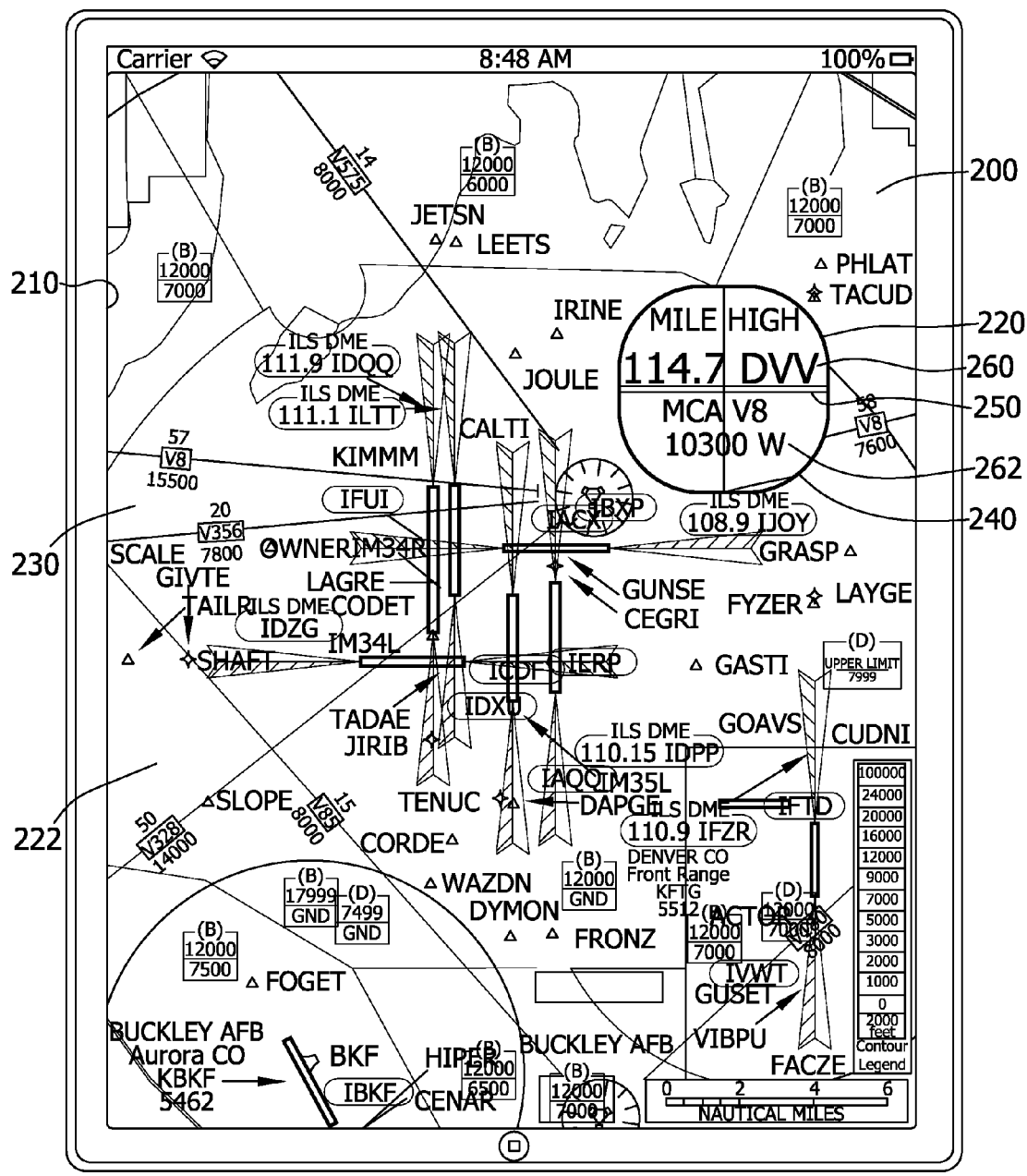
FIG. 3 is an illustration of the aviation chart of FIG. 2 with the magnified area more usefully positioned over a VOR (VHF omnidirectional range) marker.

FIG. 3 is an illustration of navigation chart 200 with the magnified area 220 more usefully positioned over the frequency information 260 for a VOR (VHF omnidirectional range) marker, enabling easy reading of the minimum crossing altitude 262 and other data associated with the VOR marker on the chart 200.

Figure 4:
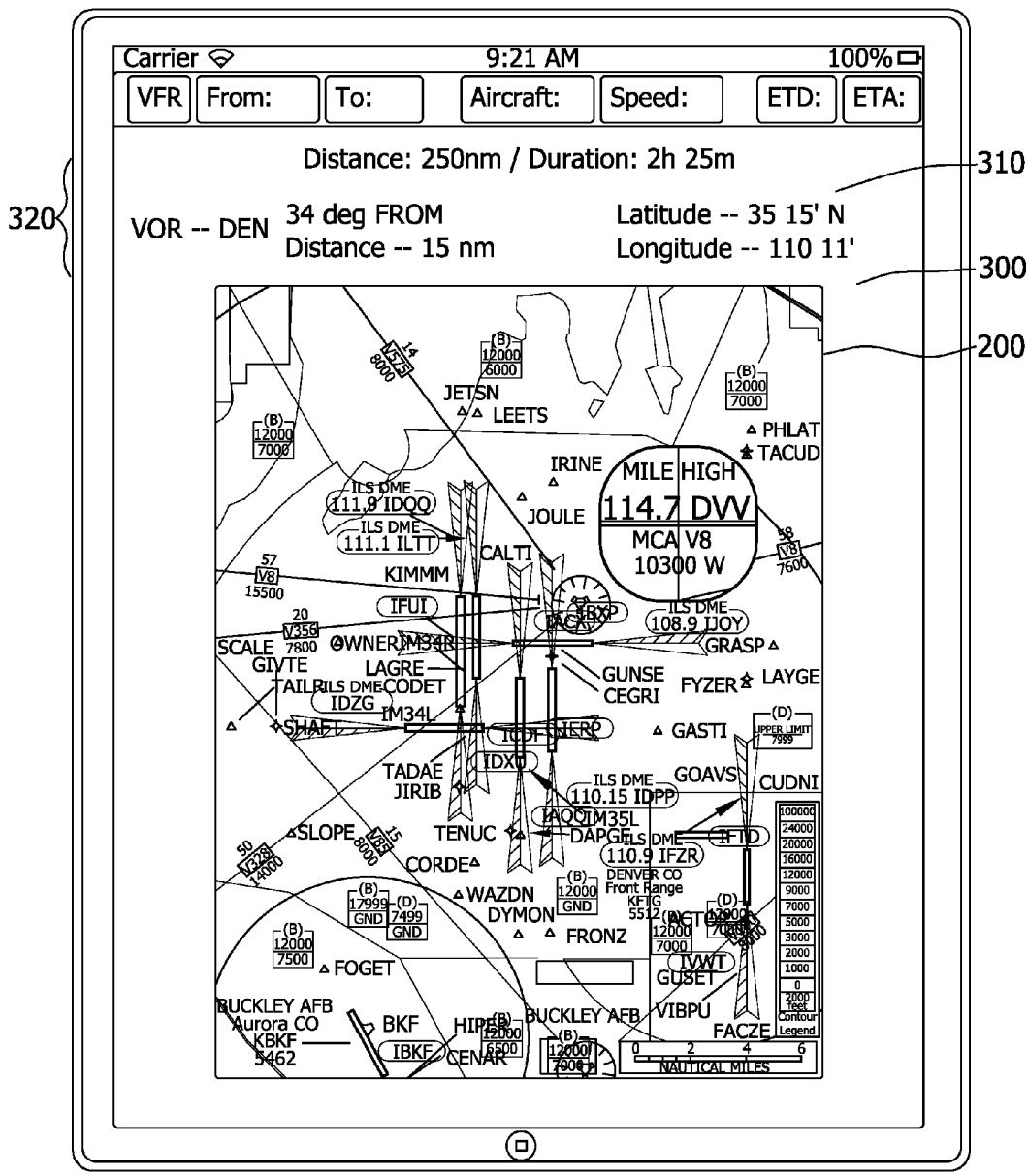
FIG. 4 is an illustration of a display where the aviation chart of FIG. 2 takes up only a portion of a display, thereby defining a non-chart portion of the display.

FIG. 4 is an illustration of a display 300 where chart 200 takes up only a portion of display 300, thereby defining a non-chart portion 310 of display 300. Display 300 is programmed to utilize the non-chart portion 310 for textual displays 320. In the illustrated embodiment, the textual displays 320 are shown as being above the chart 200 and include latitude, longitude, distance from, and radial for a VOR marker within the magnified area. Textual displays 320 allow for accurate identification of points on the chart 200, and for display of additional data about those points. The data values shown as textual displays 320 and on chart 200 are for illustrative purposes only and should not be considered as accurate.

Figure 5:
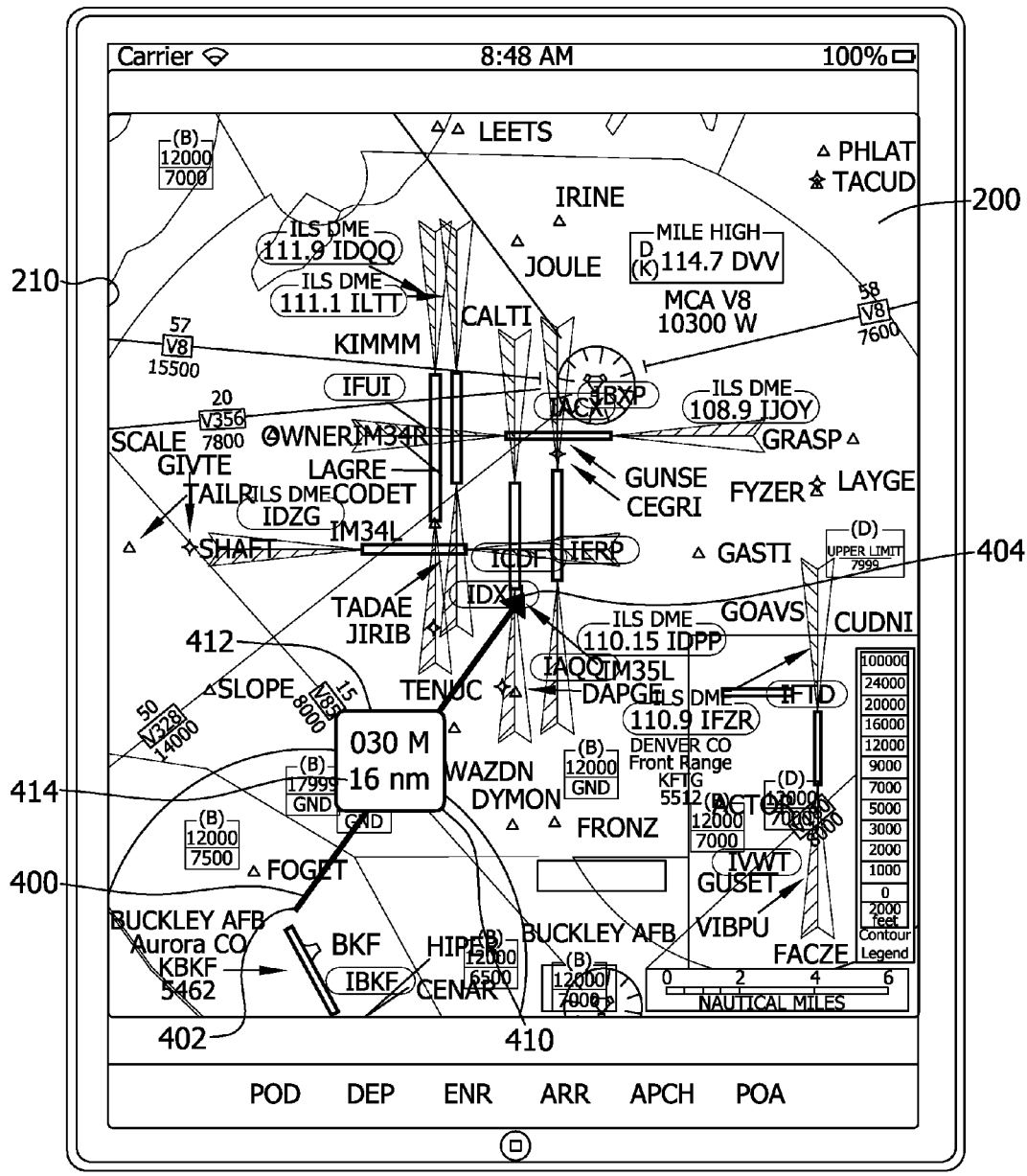
FIG. 5 is an illustration of a multiple touch capability operable to overlay a magnetic bearing and distance between two user touch points on the aviation chart of FIG. 2.

FIG. 5 is an illustration of a multiple touch capability operable for use with chart 200 displayed on display 210. Consistent with the embodiments described above, an arrow 400 extends from a location 402 of a first user touch of the touch screen of display 210 to a location 404 of a second user touch of the touch screen of display 210. Upon recognition of the user touch locations, the arrow 400 is generated by the software operable for display 210. In addition and in embodiments, a text box 410 is also generated. In the illustrated embodiment, text box 410 includes a magnetic bearing 412 from the location 402 of the first user touch to the location 404 of the second user touch as well as a distance 414 between location 402 and location 404. In the illustrated embodiment, this distance 414 is shown in nautical miles. In an embodiment, crosshairs may be incorporated into the display 210 which allow the user to more accurately place their touch locations.

As easily understood by those skilled in the art, the described embodiments may also be utilized in the accurate creation of user defined waypoints for display on chart 200. As discerned from FIGS. 2-5, the embodiments described herein are capable of being implemented on a variety of devices ranging from permanently mounted aircraft displays to portable user devices that have a touch screen, chart display capability, and capability to determine location with respect to an electronic chart. Such hardware and display capabilities are found in numerous consumer devices, for example, so called smartphones and a myriad of portable computing devices.

The described embodiments depend upon a combination of software techniques for manipulating, in real time, the graphical view of the chart 200, and geospatial database processing that can, again in real time, convert coordinates associated with display 210 (location on the device screen that is under the crosshairs or is being touched) to latitude and longitude or other values.

Figure 6:
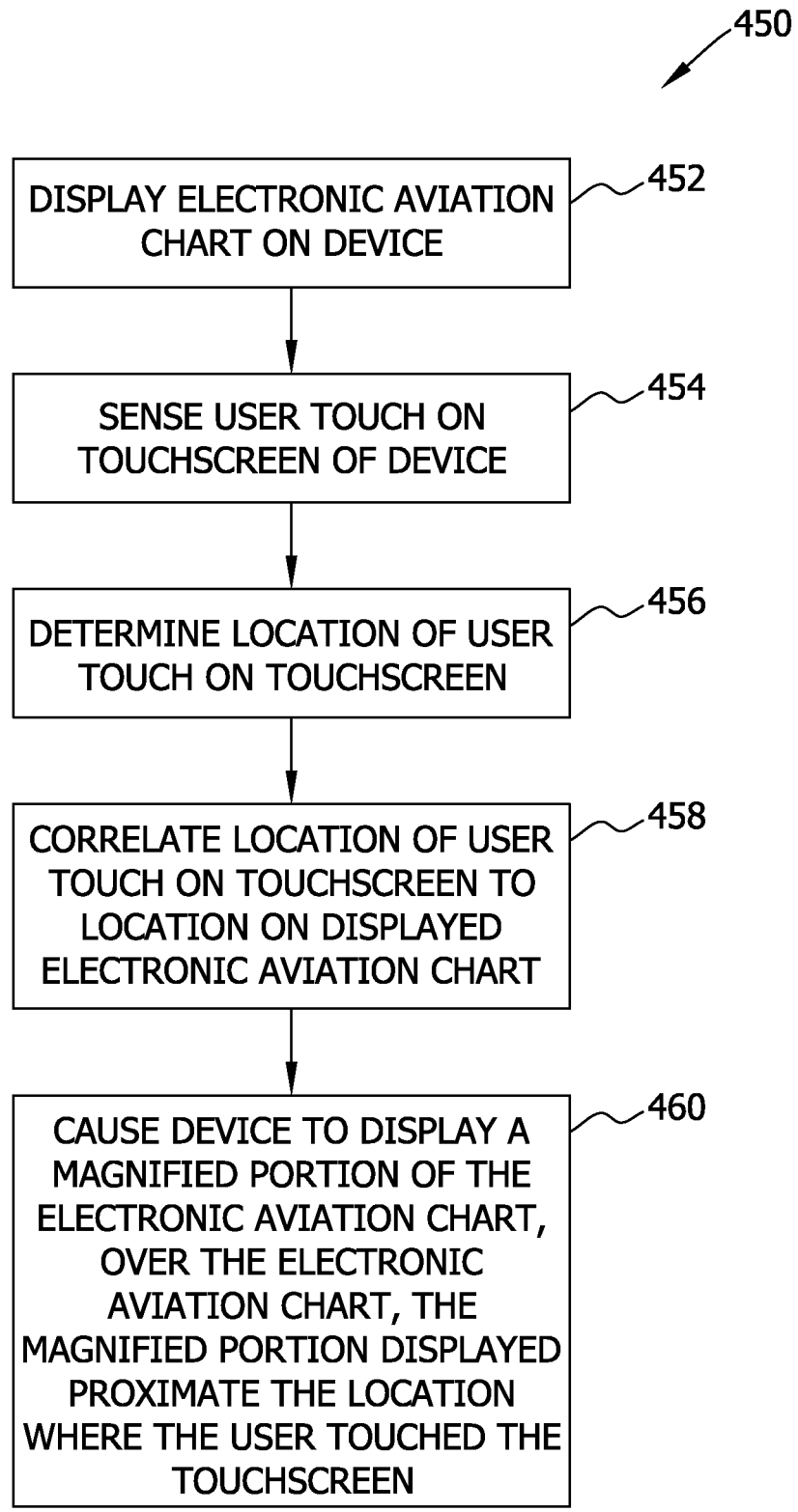
FIG. 6 is a flowchart illustrating a process for causing a magnified area to be displayed on the aviation chart of FIG. 2.

FIG. 6 is a flowchart 450 illustrating one of the processes that may be performed by the device upon which chart 200 is displayed. Initially, an electronic chart such as chart 200 is displayed 452 on the device, such as a smartphone or permanently mounted aircraft display as described above. During operation of the device as an electronic chart display, the device senses 454 a user touch of the touch screen. As described above, in embodiments, that touch has to be sensed for a predefined period of time before the device considers the touch an intended touch. The device is programmed to determine 456 the location on the touch screen where the user touch has occurred. The device then correlates 458 the location on the touch screen where the user touch has occurred with a location on the electronic chart such that the device is caused 460 to display a magnified area that includes a portion of the electronic chart, the magnified area being overlaid onto the electronic chart.

As described herein, the magnified area may be of a predefined or user defined size, and the magnified area is displayed proximate the location where the user touched the touch screen. As also described, once the magnified area is displayed, the user may utilize a prolonged touch to the touch screen to move the magnified area, e.g., based upon a sensed path, about the electronic chart, thereby providing a magnified "window" of at least a portion of the information from the electronic chart that is "below" the magnified area. A similar process is utilized for the two touch embodiment, that is, locating on the touch screen the location of the two touches that provides the arrow and the bearing and distance information as described above. In the described embodiments, the magnified area and the arrow with bearing and distance information, for example, may be referred to as a charting tool that is overlaid over the displayed aviation chart. In yet another instance, the navigation information and the magnified area are displayed in a first portion of the display of the device, while textual information related to the magnified area is displayed in a second portion of the display of the device.

Figure 7:
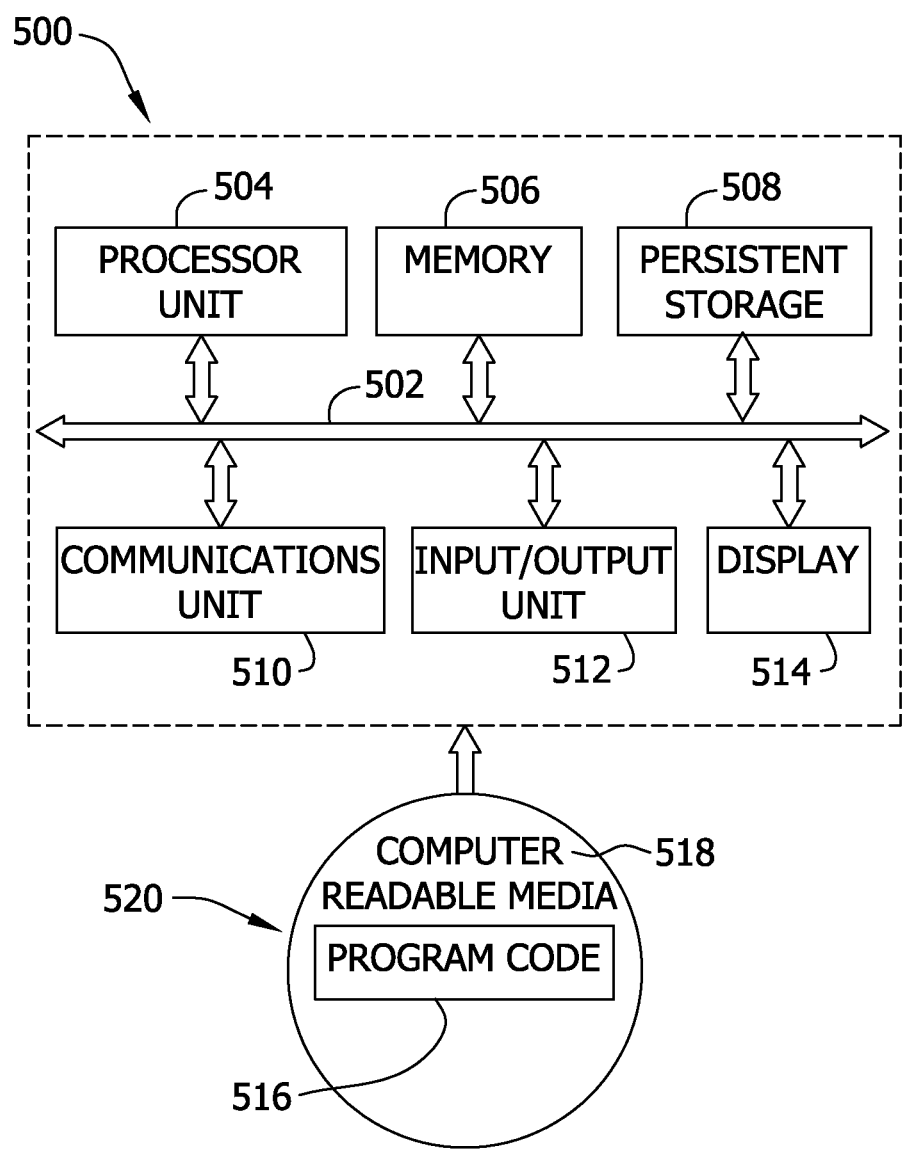
FIG. 7 is a diagram of a data processing system.

With the range of devices capable of executing the software necessary for generating such displays understood, FIG. 7 is a diagram of one possible data processing system 500 that might be utilized in providing the embodiments described herein. As such, data processing system 500 is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, without limitation, a random access memory or any other suitable volatile or non-volatile storage device. Persistent storage 508 may take various forms depending on the particular implementation. For example, without limitation, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, without limitation, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communication links.

Input/output unit 512 allows for input and output of data with other devices that may be connected to data processing system 500. For example, without limitation, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 320 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508. In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 516 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 516 may be a server computer, a client computer, or some other device capable of storing and transmitting program code 516.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are examples of storage devices in a tangible form. The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 506 or a cache such as that found in an interface and memory controller hub that may be present in communications fabric 502.

As mentioned above, the described embodiments provide enhanced readability of selected navigation chart elements through magnification which allows for easier reading generally, and especially under low light conditions. The embodiments further provide for the enhanced readability of particular textual elements without cumbersome zooming in and out of the entire chart. Intuitive identification of points of interest is provided through touch interaction, and viewing of relevant information about the points is provided with improved accuracy due to magnification. Prior to the embodiments described herein, zooming of the entire chart was required. In addition, accurately specifying points on an electronic chart was problematic as manipulation of a mouse or entry of data via a keyboard was required.

As described, the embodiments take advantage of touch screen capabilities to provide a more intuitive method of identifying a point of interest on an electronic navigation chart making such embodiments more likely to be used, especially in the demanding environment of an aircraft cockpit, seafaring vessel, or for land navigation.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for accessing information on an electronic version of a navigation information display said method comprising:
displaying navigation information in a first portion of a display of a device, the device incorporating a touch screen;
sensing a user touch on the touch screen;
determining, by the device, a location on the touch screen where the user touch has occurred;
correlating the location on the touch screen where the user touch has occurred with a selected location in the navigation information;
displaying a magnified area of a portion of the navigation information corresponding to the selected location, wherein the magnified area is displayed at a position proximate to and above the location on the touch screen where the user touch occurred, and wherein a displayed size of the magnified area is based on at least one user preference; and
displaying textual information related to the magnified area in a second portion of the display device, wherein the textual information includes a latitude and longitude corresponding to the selected location in the navigation information, and wherein the second portion does not overlap the first portion of the display device.

2. The method according to claim 1 wherein displaying the magnified area comprises displaying the magnified area over a remainder of the navigation information without underlying content within the magnified area.

3. The method according to claim 1 wherein sensing the touch by a user on the touch screen comprises at least one of:
sensing the user touch for a predefined period of time before considering the touch an intended touch; and
sensing the user touch for a user defined period of time before considering the touch an intended touch.

4. The method according to claim 1 wherein displaying the magnified area of the navigation information comprises causing the magnified area to be moved about the display based upon a sensed path of a prolonged touch by the user upon the touch screen.

5. The method according to claim 4 further comprising changing a content of the magnified area according to a relative position of the magnified area with respect to the navigation information being displayed.

6. The method according to claim 1 wherein displaying the magnified area of the navigation information comprises enclosing the magnified area within a boundary, the boundary being displayed on the display of the device.

7. The method according to claim 1 wherein displaying the magnified area of the navigation information comprises displaying crosshairs within the magnified area.

8. The method according to claim 1 further comprising:
displaying the navigation information and the magnified area in a first portion of the display of the device; and
displaying textual information related to the magnified area in a second portion of the display of the device.

9. The method according to claim 1 further comprising displaying the portion of the navigation information outside of the magnified area as the portion was displayed prior to the displaying of the magnified area.

10. The method according to claim 1 further comprising removing the magnified area from the display after a predetermined amount of time has passed since a touch by the user on the touch screen has been sensed.

11. One or more non-transitory computer-readable storage media having computer-executable instructions embodied thereon, wherein when executed by at least one processor, the computer-executable instructions cause the at least one processor to:
display navigation information in a first portion of a touch screen display of a device associated with the at least one processor;

sense a first user touch on the touch screen;
determine, by the device, a location on the touch screen where the first user touch has occurred;
correlate the location on the touch screen where the first user touch has occurred with a selected location in the navigation information;
display a magnified area of a portion of the navigation information corresponding to the selected location, wherein the magnified area is displayed at a position proximate to and above the location on the touch screen where the user touch occurred, and wherein a displayed size of the magnified area is based on at least one user preference, and wherein
the magnified area overlaid over the navigation information; and
display textual information related to the magnified area in a second portion of the touch screen display, wherein the textual information includes a latitude and longitude corresponding to the selected location in the navigation information, wherein the second portion does not overlap the first portion of the touch screen display.

12. One or more non-transitory computer-readable storage media according to claim 11 wherein to display the magnified area, the computer-executable instructions cause the at least one processor to:
determine, by the device, a location on the touch screen where a second user touch has occurred;
correlate the location on the touch screen where the second user touch has occurred with a location on the navigation information; and
display an indicator that is overlaid over the navigation information, the indicator extending from the location where the first user touch occurred to the location where the second user touch occurred.

13. One or more non-transitory computer-readable storage media according to claim 12 wherein to display the indicator, the computer-executable instructions cause the at least one processor to display a text box proximate the indicator, the text box including at least a bearing and distance information from the location where the first user touch occurred to the location where the second user touch occurred.

14. One or more non-transitory computer-readable storage media according to claim 11 wherein to display the magnified area of a portion of the navigation information, the computer-executable instructions cause the at least one processor to:
cause the magnified area to be moved about the display based upon a sensed path of a prolonged touch by the user upon the touch screen; and change a content of the magnified area according to a relative position of the magnified area with respect to the navigation information being displayed.

15. A system for displaying electronic navigation charts, said system comprising:
a processing device;
a memory coupled to said processing device, said memory for storing data defining the electronic navigation charts; and
a display comprising a touch screen, said display and said touch screen communicatively coupled to said processing device, said processing device configured to:
cause the electronic navigation charts to be displayed in a first portion of said display;
receive data from said touch screen indicating one or more user touches on said touch screen;
determine, based on the data received from said touch screen, a location on said touch screen where the one or more user touches have occurred;
correlate the location on said touch screen where the one or more user touches have occurred with the data defining the electronic navigation charts;
display a magnified area of a portion of the navigation information corresponding to the selected location, wherein the magnified area is displayed at a position proximate to and above the location on the touch screen where the user touch occurred, wherein a displayed size of the magnified area is based on at least one user preference, and wherein
the magnified area overlaid over the electronic navigation charts; and
cause textual information related to the magnified area to be displayed in a second portion of said display, the textual information including a latitude and longitude corresponding to the location where the one or more user touches have occurred in the electronic navigation charts, and wherein the second portion does not overlap the first portion of said display.

16. The system according to claim 15 wherein to display said magnified area, said processing device is configured to display:
an indicator and a text box proximate the indicator, the text box including at least a bearing and distance information from the location where a first of the one or more user touches occurred to the location where a second of the one or more user touches occurred.

* * * * *